United States Patent [19]
Hirata

[11] Patent Number: 4,890,280
[45] Date of Patent: Dec. 26, 1989

[54] FRAME RELAY TYPE DATA SWITCHING APPARATUS

[75] Inventor: Hideyuki Hirata, Tokyo, Japan

[73] Assignee: NEC Corporation, Japan

[21] Appl. No.: 270,025

[22] Filed: Nov. 14, 1988

[30] Foreign Application Priority Data

Nov. 11, 1987 [JP] Japan .................. 62-286147

[51] Int. Cl.$^4$ ............................................ H04Q 11/04
[52] U.S. Cl. ...................................... 370/60; 370/94.1
[58] Field of Search .......................... 370/60, 94, 110.1

[56] References Cited

U.S. PATENT DOCUMENTS

| | | | |
|---|---|---|---|
| 4,707,831 | 11/1987 | Weir et al. ............................ | 370/94 |
| 4,736,370 | 4/1988 | Hirome et al. ...................... | 370/94 |
| 4,755,986 | 7/1988 | Hirata .................................. | 370/60 |
| 4,763,321 | 8/1988 | Calvignac et al. .................. | 370/94 |

FOREIGN PATENT DOCUMENTS 61-21836  1/1986  Japan .
61-21837  1/1986  Japan .

OTHER PUBLICATIONS

Unsoy, "ISDN Pocket Services Evolution", IEEE 1987, pp. 281-285.
Suzuki et al., "Highspeed Pocket Switching Protocol", IEEE 1987, pp. 1866-1870.

Primary Examiner—Joseph A. Orsino
Assistant Examiner—Frank M. Scutch, III
Attorney, Agent, or Firm—Leydig, Voit & Mayer

[57] ABSTRACT

The disclosed data switching apparatus comprises an input control unit which separates a header from communication data contained in logical channel data, as associative memory which compares the header with incoming logical channel numbers previously registered and which outputs an address control signal associated with an address where any of the incoming logical channel numbers coincident with the header are stored, a temporary storage circuit for outputting, based on the address control circuit, an outgoing logical channel number previously registered and associated with the coincident incoming logical channel number, a communication data buffer for temporarily storing the communication data, and an ouput control unit for combining the outgoing logical channel number from the temporary circuit and the communication data from the communication data buffer and delivering the combination to the outgoing communication channel.

12 Claims, 4 Drawing Sheets

FRAME RELAY TYPE DATA SWITCHING APPARATUS

BACKGROUND OF THE INVENTION

The present invention relates to a packet switching apparatus for a data switching network and, more particularly, to a frame relay type data switching apparatus for implementing frame relaying services in an Integrated Services Digital Network (ISDN).

Frame relaying in an ISDN is a communication system in which only the function of updating headers on the basis of logical channel numbers is performed within the network while the processing associated with the retransmission of data due to data transfer errors and other faults is performed on an end-to-end basis ("ISDN PACKET SERVICES EVOLUTION" Mehmet Unsoy, IEEE 1987, A4.4.1–A4.4.5).

An example of prior art switching networks is proposed by Suzuki et al., NEC Co., in a paper entitled "High Speed Packet Switching Protocol," GLOBECOM '87, 47.3.1–47.3.5, 1987. The proposed data switching apparatus has on software a table which shows the correspondence of incoming logical channel numbers and outgoing logical channel numbers. When the arrival of data over any incoming communication channel is detected, the data are temporarily stored in a memory and the software table mentioned above is accessed by using a header of the data so as to find out an outgoing logical channel number associated with the incoming communication channel. Then, the header of the data is updated on the basis of the outgoing logical channel number, followed by processing for delivering the data to the outgoing channel.

A drawback with the prior art data switching apparatus discussed above is that the a prohibitive number of times of memory access are needed for updating the header because the correspondence of incoming and outgoing logical channel numbers are provided via software. Furthermore, since such updating is implemented by a processor, high speed processing is not achievable unless not only buffers and others associated with the channels but also the access time to the memory which stores the software table and the processor instructions are sufficiently fast.

SUMMARY OF THE INVENTION

It is therefore an object of the present invention to provide a data switching apparatus which updates a header with no regard to the operation of a processor to thereby reduce the number of times of memory access, i.e., to effect rapid memory access.

It is another object of the present invention to provide a data switching apparatus which reduces the number of times of memory access to one and allows header updating to be executed with no regard to the capacity of a processor, thereby enhancing the switching ability in proportion to the increase in memory access speed and independently of a call processing ability which in conventional apparatus would be required of a processor.

It is another object of the present invention to provide a data switching apparatus which applies an address control output of an association memory directly to a temporary storage circuit without coding it to thereby implement high speed access and miniature circuit construction which are desirable for large scale circuit integration.

It is another object of the present invention to provide, in view of the fact that the length of a word of an associative memory and that of a temporary storage circuit may be freely chosen by arranging large scale integrated circuits in parallel, for example, a data switching apparatus which allows the format and content of a header to be formed freely chosen and is therefore applicable to a wide range of communication systems.

A data switching apparatus of the present invention comprises an input control unit for separating a header and communication data which are contained in logical channel data on an incoming communication channel applied to the input control unit from each other, an association memory for comparing the header with incoming logical channel numbers registered beforehand and outputting an address control signal associated with an address where any of the incoming logical channel numbers coincident with the header is stored, a temporary storage circuit for outputting, based on the address control signal, an outgoing logical channel number registered beforehand and associated with the coincident incoming logical channel number, a communication data buffer for temporarily storing the communication data, and an output control unit for combining the outgoing logical channel number from the temporary storage circuit and the communication data from said communication data buffer and delivering the combined outgoing logical channel number and communication data as logical channel data to the outgoing communication channel.

BRIEF DESCRIPTION OF THE DRAWINGS

The above and other objects, features and advantages of the present invention may be fully understood from the following detailed description and accompanying drawings in which.

In the drawings, the same reference numerals represent the same structural elements.

DESCRIPTION OF THE PREFERRED EMBODIMENT

Figure 1:
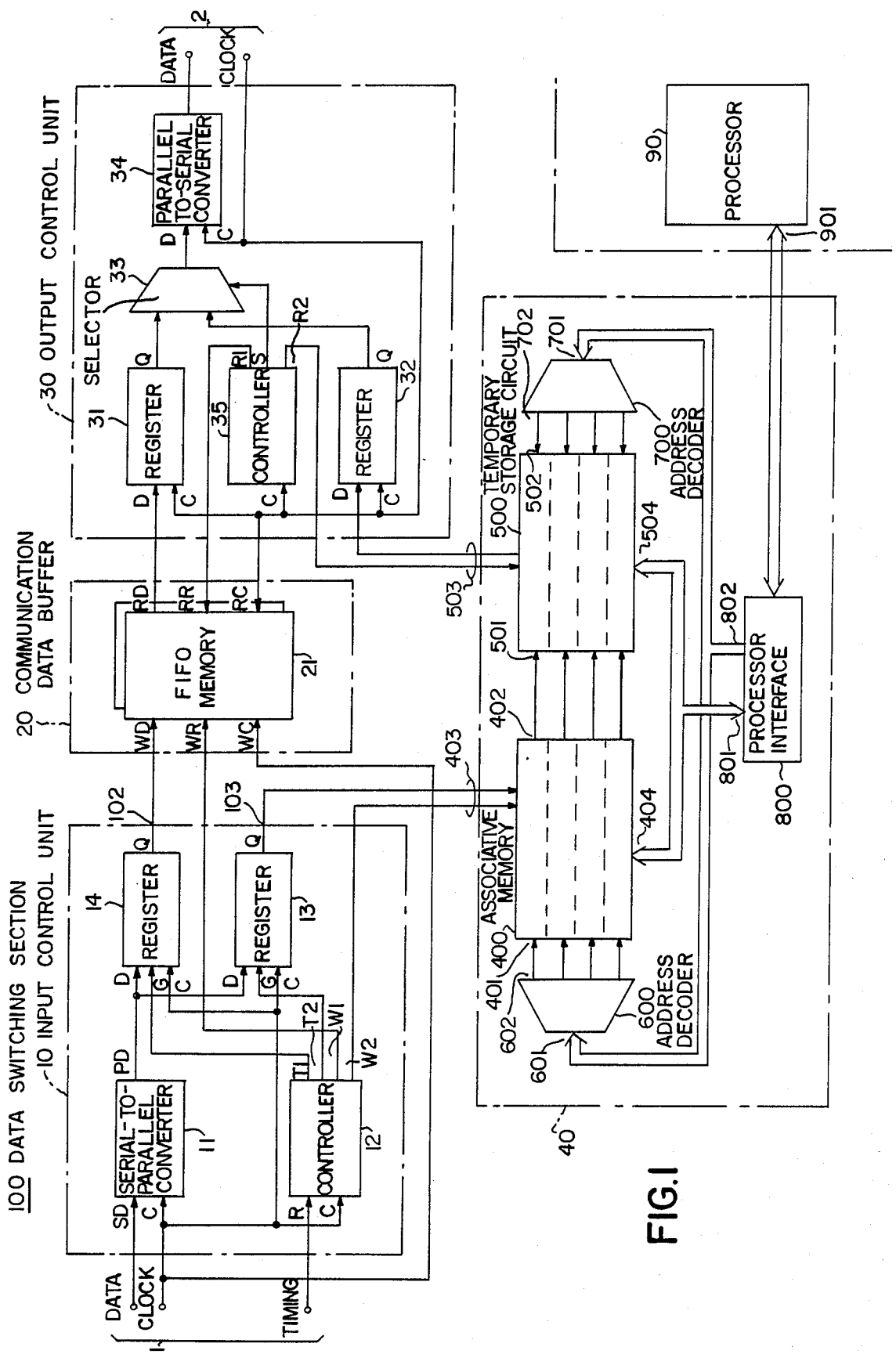
FIG. 1 is a schematic block diagram showing a data switching apparatus embodying the present invention.

Referring to FIG. 1 of the drawings, a data switching apparatus embodying the present invention is shown and generally comprised of a processor 90 and a data switching section 100 connected to the processor 90.

The data switching section 100 includes an input terminal 1 for receiving logical channel data on an incoming input communication channel (not shown), an input control unit 10 for separating a header and communication data contained in the logical channel data from each other, and a header translating circuit 40 for updating the separated header. The data switching section 100 further includes a communication data buffer 20 for temporarily storing the separated communication data, an output control unit 30 for combining an outgoing logical channel number from the header translating circuit 40 and the communication data from the data buffer 20 to produce logical channel data, and an output terminal 2 for delivering the logical channel data coming out of the output control unit 30 to an outgoing communication channel (not shown).

The header translating circuit 40 includes an associative memory 400 for comparing the header with incoming logical channel numbers registered in advance and outputting an address control signal associated with a particular address which stores an incoming logical channel number coincident with the header. A temporary storage circuit 500 produces, in response to the address control signal, an outgoing logical channel number which is registered beforehand and associated with the coincident incoming logical channel number. A processor interface 800 delivers the incoming logical channel number fed thereto from the processor 90 to the associative memory 400, delivers the incoming logical channel number address to the associative memory 400 via an address decoder 600, delivers the outgoing logical channel number fed thereto from the processor 90 to the temperary storage circuit 500, and delivers the output logical channel number address to the temporary storage circuit 500 via an address decoder 700.

The input control unit 10 is made up of a serial-to-parallel (SP) converter 11, a controller 12, a first register 13, and a second register 14. Logical channel data are serially applied to a terminal SD of the SP converter 11 via a DATA terminal of the input terminal 1 of the input control unit 10. While the input terminal 1 includes a DATA, a clock and a timing input terminal, how to separate a clock from serial data on the transmission path is a discussion relating to transmission systems and not directly relating to the present invention and, therefore, details thereof will not be described herein.

Figure 2:
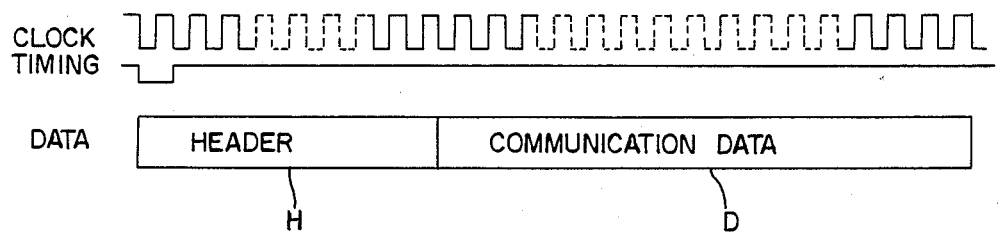
FIG. 2 shows a frame format of logical channel data particular to the data switching apparatus of the present invention.

As shown in FIG. 2, the input applied to the input terminal 1 consists of a header H and communication data D. The beginning and end of such a frame are detected on the basis of a flag pattern. For the simplicity of description, assume that the frame has a certain predetermined length, and that all the timings necessary for data switching are attained by detecting the beginning of the frame only. Hence, data, a clock and a timing signal are related as shown in FIG. 2.

Logical circuit data shown in FIG. 2 are applied serially to the terminal SD of the SP converter 11 via the input terminal 1 of the input control unit 10. The SP converter 11 transforms the incoming data into parallel data on an octad (eight bits) basis while delivering them via its terminal PD. The data coming out of the SP converter 11 are fed to the first and second registers 13 and 14. The first register 13 stores the header H whose length is one octad in response to a control signal T2 which is fed to the register 13 from the controller 12. Likewise, the second register 14 stores the communication data D on an octad basis in response to a control signal T1 from the controller 12. The controller 12 is reset when a timing signal is applied to its terminal R so as to begin producing the control signals T1 and T2 and control signals W1 and W2. Among the logical channel data separated by the input control unit 10, the header H is fed from the first register 13 to an output 103 and then to an input 403 of the associative memory 400 of the header translating circuit 40. The communication data D is delivered from the second register 14 to the communication data buffer 20 via an output 102. The communication data buffer 20 is implemented by a First-In First-Out (FIFO) memory 21. Receiving the control signal W1 from the controller 12 at a terminal WR and clocked by the clock signal C, the FIFO memory 21 accumulates the communication data D which are fed to a terminal WD via an input 102.

The associative memory 400 receives the header H to compare from the input control unit 10 via the a header input 403 and is connected to a data input/output terminal 801 of a processor interface 800 via an a data input 404 and to an address output terminal 802 via the address decoder 600. In this configuration, data are written in and read out of the memory 400 under the control of the processor 90. The associative memory 400 and the temporary storage circuit 500 have the same number of addresses (four addresses in FIG. 1) and each is capable of storing data associated with the header on an address basis.

More specifically, the associative memory 400 has address control inputs (e.g. 401) supplied from the address decoder 600 on an address basis and address control outputs (e.g. 402) outputted upon coincidence of data. The address control outputs (e.g. 402) of the memory 400 are individually connected as address control inputs (e.g. 501) to the cells of the same address of the temporary storage circuit 500. The temporary storage circuit 500 has address control signal inputs (e.g. 501 and 502) which are fed from the association memory 400 and address decoder 700 on an address basis, so that it may be accessed from any of the memory 400 and address decoder 700 by cycle assignment, for example. Further, the temporary storage circuit 500 may be accessed from the processor interface 800 in the same manner as the associative memory 400. When supplied with an address control input (e.g. 501) from the associative memory 400, the temporary storage circuit 500 applies to a header output 503 data (updated header) which is stored in a corresponding address.

The output control unit 30 comprises a third register 31, a fourth register 32, a selector 33, a parallel-to-serial (PS) converter 34, and a controller 35. When the controller 35 delivers a control signal R2 to the terminal 503 of the temporary storage circuit 500, a translated header H is read out of the associated area of the circuit 500 and fed to the fourth register 32. The controller 35 delivers a control signal R1 to a terminal RR of the FIFO memory 21. In response, the FIFO memory 21 reads out the stored communication data D via a terminal RD and feeds it to the third register 31. Thereafter, the controller 35 applies a selection signal S to the selector 33 so as to switch the header H from the fourth register 32 and the communication data D from the third register 31. As a result, the header H and the communication data D are applied to the PS converter 34 such that the logical channel data shown in FIG. 2 are produced. More specifically, the PS converter 34 converts the header H and the communication data D outputted in parallel by the selector 33 into serial data and feeds them out via the output terminal 2.

Figure 3:
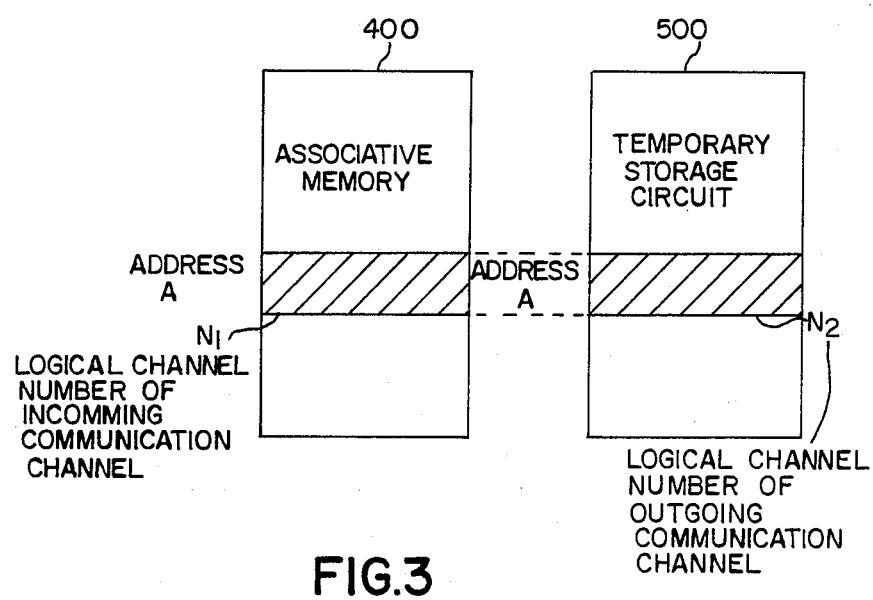
FIG. 3 shows correspondence between incoming logical numbers stored in an associative memory and outgoing logical numbers stored in a temporary storage in accordance with the present invention.

Referring to FIG. 3, there is shown the correspondence between incoming logical channel numbers stored in the associative memory 400 and ougoing logical channel numbers stored in the temporary storage circuit 500. In the figure, A, $N_1$ and $N_2$ are respectively representative of an address, a logical channel number of an incoming communication channel, and a logical channel number of an outgoing communication channel associated with the incoming channel.

In FIG. 1, when the logical channel data are applied to the input control unit 10, the header H and the communication data D are separated from each other. The header H is handled as compare data for the associative memory 400. At this instant, the associative memory 400 has been loaded with a logical channel number (header H) which is representative of an incoming communication channel being occupied. In FIG. 3, that area of the memory 500 which has the same address as the association memory 400 has been loaded with a logical channel number $N_2$ fed from the processor 90 and representative of an outgoing communication channel which is associated with the logical channel number $N_1$ (logical channel number associated with the header H stored in the associative memory 400). Hence, if a logical channel number coincident with the header H which has been separated by the input control unit 10 to serve as compare data for the associative memory 400 is registered in the memory 400, an address control output (e.g. 402) of the corresponding address is made active. As a result, a logical channel number (updated header) stored in the same address of the temporary storage circuit 500 is outputted and applied to the output control unit 30. In response to this new header portion, the output control unit 30 reads out communication data temporarily stored in the communication data buffer 20, combines them with the new header portion, and feeds the combined header and communication data to the outgoing communication channel.

Figure 4:
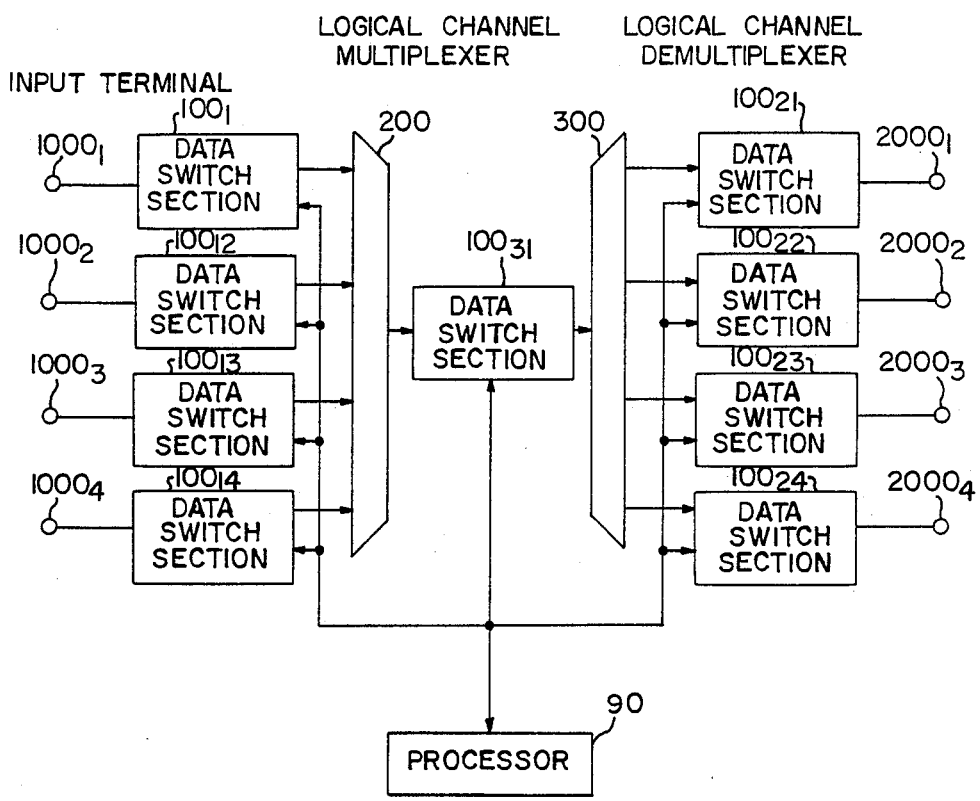
FIG. 4 is a block diagram schematically showing a data switching network which is implemented by the data switching apparatus of the present invention.

Referring to FIG. 4, a data switching network which is implemented by a data switching apparatus of the present invention is shown in a schematic block diagram. In the figure, there are shown input terminals $1000_1$, $1000_2$, $1000_3$ and $1000_4$, output terminals $2000_1$, $2000_2$, $2000_3$ and $2000_4$, data switching sections $100_{11}$ to $100_{14}$, $100_{21}$ to $100_{24}$ and $100_{31}$, a logical channel multiplexer 200, and a logical channel demultiplexer 300. By combining a plurality of the previously stated frame relay type data switching apparatus with the logical channel multiplexer and demultiplexer 200 and 300, it is possible to construct a large-scale data switching network as shown in FIG. 4.

Figure 5:
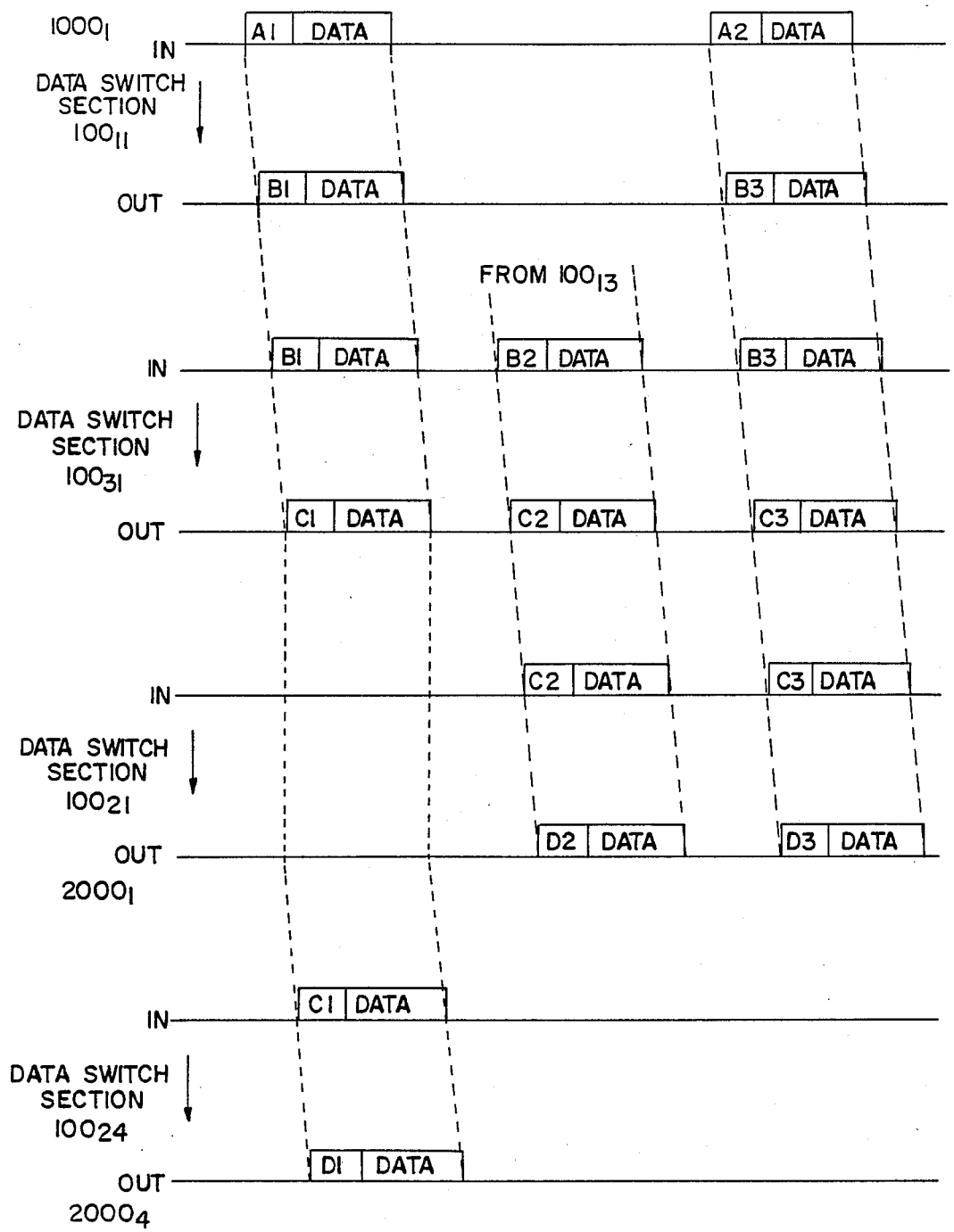
FIG. 5 is a chart useful for understanding the operation of the data switching network shown in FIG. 4.

The operation of the network of FIG. 4 will be described with reference also made to FIG. 5. When logical channel data individually having headers A1 and A2 are sequentially applied from the input terminal $1000_1$ to the data switching section $100_{11}$, they are respectively translated into header portions B1 and B3 and then routed to the data switching section $100_{31}$ via the logical channel multiplexer 200. While the headers A1 and A2 are the headers which are agreed upon locally by the data switching apparatus and subscribers (not shown) at the time of origination and reception of a call, the headers B1 and B3 are the call identification numbers which may be freely chosen within the range of the maximum logical multiplexing capacity of the data switching apparatus.

Logical channel data are also applied to the data switching section $100_{13}$ via the input terminal $1000_3$, and a header thereof is translated into a header B2 and then fed to the data switching section $100_{31}$. The data switching section $100_{31}$ converts the headers B1, B2 and B3 into headers C1, C2 and C3, respectively. These headers C1, C2 and C3 are adopted to simplify the operations of the logical channel demultiplexer 300 and are applied to the demultiplexer 300. For example, the header C1 has such a preset value that it is routed to the data switching section $100_{24}$ while the headers C2 and C3 have such a preset value that they are routed to the data switching section $100_{21}$. Referencing the header of data outputted by the data switching section $100_{31}$, the demultiplexer 300 distributes data associated with the header C1, for example, to the data switching section $100_{24}$ and the data associated with the header C2 or C3 to the data switching section $100_{21}$. The data switching sections $100_{24}$ and $100_{21}$ convert respectively the header C1 and the headers C2 and C3 into a header D1 and headers D2 and D3. It is to be noted that the headers D1, D2 and D3 are the headers which are arranged locally by the data switching apparatus and subscribers (not shown) at the time of origination and reception of a call.

What is claimed is:

1. A switching apparatus for updating an incoming logical channel number of logical channel data on an incoming communication channel to an output logical channel number and then delivering the output logical channel number to an outgoing communication channel, said data switching apparatus comprising:
   an input control unit for separating a header and communication data which are contained in the logical channel data on the incoming communication channel applied to said input control unit from each other;
   an associative memory connected to the input control unit for comparing the header with incoming logical channel numbers registered beforehand and outputting an address control signal associated with an address where any of the incoming logical channel numbers coincident with the header is stored;
   a temporary storage circuit for outputting, based on the address control signal, an outgoing logical channel number registered beforehand and associated with the coincident incoming logical channel number;
   a communication data buffer connected to the input control unit to receive the communication data separated from the header for temporarily storing the communication data; and
   an output control unit for combining the outgoing logical channel number from said temporary storage circuit and the communication data from said communication data buffer and delivering the combined outgoing logical channel number and communication data as logical channel data to said outgoing communication channel.

2. A data switching method comprising the steps of:
   receiving logical channel data containing a header and communication data over an incoming communication channel;
   comparing the header with incoming logical channel signals registered beforehand for coincidence with any of the registered incoming logical channel numbers;
   outputting an outgoing logical channel number registered beforehand and associated with an incoming logical channel number found to be coincident with the header;
   temporarily storing the communication data in a communication data buffer; and
   combining the outgoing logical channel number and the communication data and transmitting the combined outgoing logical channel number and communication data as logical channel data to an outgoing communication channel.

3. A data switching method comprising the steps of:
receiving a first data frame having a header including an incoming logical channel number and having communication data;
separating the header from the communication data;
storing the communication data in a communication data buffer;
outputting an outgoing logical channel number registered beforehand so as to correspond with the incoming logical channel number of the header of the first data frame;
combining the outgoing logical channel number and the communication data to produce a second data frame; and
transmitting the second data frame.

4. A method according to claim 3 wherein the step of separating includes operating a first controller to separate the header from the communication data.

5. A method according to claim 3 wherein the step of combining includes operating a second controller to combine the outgoing logical channel number and the communication data.

6. A frame relay type data switching apparatus comprising:
an input control unit having an input and first and second outputs, the input being connected to received a first data frame including a header having an incoming logical channel number and communication data, the input control unit including a first controlling means for detecting the first data frame at the input, for separating the header and the communication data, and for outputting the header and the communication data from the first and second outputs, respectively;
a communication data buffer having an input connected to the second output of the input control unit and having an output, the communication data buffer receiving and storing the communication data;
a header translating circuit including an associative memory and a temporary storage circuit connected to the associative memory, the associative memory containing a plurality of incoming logical channel addresses registered beforehand, the temporary storage circuit containing a plurality of outgoing logical channel addresses registered beforehand and respectively corresponding to the incoming logical channel addresses registered beforehand, the associative memory being connected to the first output of the input control unit to receive the header and to compare the header with the incoming logical channel addresses to find an incoming logical channel address which coincides with the header, the temporary storage circuit having an output and being connected to provide an outgoing logical channel address corresponding to the coinciding incoming logical channel addresses at the output; and
an output control unit having an output and first and second inputs, the inputs respectively connected to the communication data buffer output and the temporary storage circuit output, the output control unit including a second controlling means for combining the outgoing logical channel addresses and the communication data to produce a second data frame and for transmitting the second data frame.

7. An apparatus according to claim 6 wherein the input control unit includes a serial-to-parallel converter having a serial input connected to receive the first data frame, and wherein the first data frame is serially received by the input control unit via the serial-to-parallel converter.

8. An apparatus according to claim 6 wherein the output control unit includes a parallel-to-serial converter having a parallel input connected to the output control unit output and wherein the second data frame is serially transmitted by the output control unit via the parallel-to-serial converter.

9. An apparatus according to claim 6 wherein the associative memory and the temporary storage circuit each have an address control input and a data input.

10. An apparatus according to claim 9 wherein the header translating circuit includes a processor interface connected to a processor and connected to the address control inputs and the data inputs of the associative memory and the temporary storage circuit, thereby permitting the processor to address, read from and write into the associative memory and the temporary storage circuit.

11. An apparatus according to claim 6 wherein the associative memory has an address control output and the temporary storage circuit has a second address control input connected to the address control output of the associative memory.

12. An apparatus according to claim 6 wherein the communication data buffer includes a First-In First-Out memory.

* * * * *